United States Patent
Wang

(10) Patent No.: US 12,132,424 B2
(45) Date of Patent: Oct. 29, 2024

(54) PARAMETER IDENTIFICATION METHOD AND APPARATUS FOR WIND TURBINE GENERATOR

(71) Applicant: XINJIANG GOLDWIND SCIENCE & TECHNOLOGY CO., LTD., Xinjiang (CN)

(72) Inventor: Jinpeng Wang, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 22 days.

(21) Appl. No.: 18/259,350

(22) PCT Filed: Jun. 8, 2021

(86) PCT No.: PCT/CN2021/098802
§ 371 (c)(1),
(2) Date: Jun. 26, 2023

(87) PCT Pub. No.: WO2022/134484
PCT Pub. Date: Jun. 30, 2022

(65) Prior Publication Data
US 2024/0056008 A1    Feb. 15, 2024

(30) Foreign Application Priority Data
Dec. 25, 2020  (CN) .......................... 202011558569.1

(51) Int. Cl.
*H02P 21/18* (2016.01)
*F03D 7/02* (2006.01)
(Continued)

(52) U.S. Cl.
CPC ............ *H02P 21/18* (2016.02); *F03D 7/0224* (2013.01); *F03D 9/25* (2016.05); *H02P 21/16* (2016.02);
(Continued)

(58) Field of Classification Search
CPC ....... H02P 21/18; H02P 21/16; H02P 2101/15; H02P 6/183; H02P 6/185; H02P 9/009;
(Continued)

(56) References Cited

U.S. PATENT DOCUMENTS

| 5,028,804 A * | 7/1991 | Lauw ................. H02P 9/42 290/40 C |
| 6,621,291 B2 | 9/2003 | Lee et al. |

(Continued)

FOREIGN PATENT DOCUMENTS

| CN | 101576057 A | 11/2009 |
| CN | 103944480 A | 7/2014 |

(Continued)

OTHER PUBLICATIONS

Marco Liserre, et al. "Overview of Multi-MW Wind Turbines and Wind Parks", IEEE Transactions on Industrial Electronics, vol. 58, No. 4, Apr. 2011, 15 pages.

(Continued)

*Primary Examiner* — Pedro J Cuevas

(57) ABSTRACT

A parameter identification method and a parameter identification apparatus for a wind turbine generator are provided, in which the parameter identification method includes: controlling the generator to no-load start and shut down by adjusting a blade angle; acquiring operating data of the generator in a duration from no-load start to shutdown of the generator; and determining parameters of the generator based on the acquired operating data of the generator.

15 Claims, 4 Drawing Sheets

(51) Int. Cl.
*F03D 9/25* (2016.01)
*H02P 21/16* (2016.01)
*H02P 101/15* (2016.01)

(52) U.S. Cl.
CPC ...... *F05D 2220/76* (2013.01); *F05D 2260/70* (2013.01); *H02P 2101/15* (2015.01)

(58) Field of Classification Search
CPC .......... H02P 21/141; H02P 9/04; H02P 21/34; H02P 21/36; H02P 21/14; H02P 21/22; F03D 7/0224; F03D 9/25; F03D 7/0264; F03D 7/0272; F03D 7/046; F05D 2220/76; F05D 2260/70; Y02E 10/72
See application file for complete search history.

(56) References Cited

U.S. PATENT DOCUMENTS

| | | | | |
|---|---|---|---|---|
| 6,954,004 | B2* | 10/2005 | Skeist | H02P 9/007 290/44 |
| 6,984,897 | B2* | 1/2006 | Skeist | H02P 27/06 290/1 R |
| 7,095,128 | B2* | 8/2006 | Canini | F03D 9/25 290/44 |
| 8,046,109 | B2* | 10/2011 | Larsen | H02J 3/50 290/44 |
| 8,203,318 | B2* | 6/2012 | Fortmann | H02J 3/50 323/207 |
| 8,509,958 | B2* | 8/2013 | Larsen | H02J 3/44 700/287 |
| 8,749,082 | B2* | 6/2014 | Letas | F03D 7/0224 290/44 |
| 8,872,372 | B2* | 10/2014 | Larsen | F03D 7/00 290/44 |
| 10,018,180 | B2* | 7/2018 | Kjær | F03D 7/048 |
| 2003/0034793 | A1 | 2/2003 | Lee et al. | |
| 2004/0257832 | A1* | 12/2004 | Skeist | H02P 9/02 363/1 |
| 2005/0012487 | A1* | 1/2005 | Skeist | H02P 9/007 318/727 |
| 2010/0176770 | A1* | 7/2010 | Fortmann | H02J 3/50 323/205 |
| 2011/0109279 | A1 | 5/2011 | Li et al. | |
| 2011/0137474 | A1* | 6/2011 | Larsen | F03D 7/0284 290/44 |
| 2011/0181045 | A1* | 7/2011 | Letas | F03D 7/0224 290/44 |
| 2012/0010759 | A1* | 1/2012 | Larsen | H02J 3/48 700/292 |
| 2014/0042745 | A1 | 2/2014 | Perley et al. | |
| 2014/0152010 | A1* | 6/2014 | Larsen | F03D 7/00 290/44 |
| 2017/0234299 | A1* | 8/2017 | Kjær | F03D 9/257 290/44 |

FOREIGN PATENT DOCUMENTS

| | | |
|---|---|---|
| CN | 107592049 A | 1/2018 |
| CN | 108155843 A | 6/2018 |
| CN | 109861286 A | 6/2019 |

OTHER PUBLICATIONS

The Extended European Search Report dated May 24, 2024: Appln. No. 21908492.8.
The International Search Report mailed Aug. 30, 2021; PCT/CN2021/098802.
The Written Opinion of the International Searching Authority mailed Aug. 30, 2021; PCT/CN2021/098802.

* cited by examiner

PARAMETER IDENTIFICATION METHOD AND APPARATUS FOR WIND TURBINE GENERATOR

CROSS-REFERENCE TO RELATED APPLICATION

This application is a National Stage of International Application No. PCT/CN2021/098802 filed on Jun. 8, 2021, which claims priority to Chinese patent application No. 202011558569.1 entitled "PARAMETER IDENTIFICATION METHOD AND APPARATUS FOR WIND TURBINE GENERATOR" and filed on Dec. 25, 2020, both of which are hereby incorporated by reference in their entireties.

TECHNICAL FIELD

The present disclosure relates to the technical field of wind power generation, and more particularly, to a parameter identification method and apparatus for a wind turbine generator.

BACKGROUND

At present, vector control is widely used for wind turbine generators in the wind power industry. The vector control can implement a decoupling control of weak magnetism and torque and has the characteristics of fast control response, high precision and superior control performance. However, since the control performance of vector control is highly dependent on the accuracy of the wind turbine generator parameters and inaccurate wind turbine generator parameters will affect the control performance of the generator set, currently the wind turbine generator parameters are mainly manually written into the control system based on the wind turbine generator parameter table to implement the control function.

However, the manual configuration of the wind turbine generator parameters as described above has disadvantages that affect the control performance and maintenance efficiency of the wind turbine generator, and even the operational safety of the generator set.

SUMMARY

This disclosure provides a parameter identification method and apparatus for a wind turbine generator.

According to an aspect of exemplary embodiments of the present disclosure, a parameter identification method for a wind turbine generator is provided, including: controlling the generator to no-load start and shut down by adjusting a blade angle; acquiring operating data of the generator in a duration from no-load start to shutdown of the generator; and determining parameters of the generator based on the acquired operating data of the generator.

According to another aspect of exemplary embodiments of the present disclosure, a parameter identification apparatus for a wind turbine generator is provided, including: a start and shutdown control unit configured to control the generator to no-load start and shut down by adjusting a blade angle; a parameter acquisition unit configured to acquire operating data of the generator in a duration from no-load start to shutdown of the generator; and a parameter determination unit configured to determine parameters of the generator based on the acquired operating data of the generator.

According to yet another aspect of exemplary embodiments of the present disclosure, a computer-readable storage medium storing a computer program is provided, in which the computer program, when executed by a processor, implements the parameter identification method for a wind turbine generator of the present disclosure.

According to yet another aspect of exemplary embodiments of the present disclosure, an electronic device is provided, including: at least one processor; and at least one memory storing computer-executable instructions; in which the computer-executable instructions, when executed by the at least one processor, cause the at least one processor to perform the parameter identification method for a wind turbine generator of the present disclosure.

Additional aspects and/or advantages of the general idea of the present disclosure will be described in part in the following description, and a further part will be clear from the description or may be known by implementing the general idea of the present disclosure.

BRIEF DESCRIPTION OF THE DRAWINGS

The abovementioned and/or additional aspects and advantages of the present disclosure will become apparent from the following description of embodiments in connection with the accompanying drawings.

DETAILED DESCRIPTION

Features and exemplary embodiments of various aspects of the present disclosure will be described in detail below, and in order to make the purpose, technical solutions and advantages of the present disclosure clearer, the present disclosure is described in further detail below in conjunction with the accompanying drawings and specific embodiments. It should be understood that the specific embodiments described herein are intended to explain the present disclosure only, rather than to limit the present disclosure. To those skilled in the art, the present disclosure may be implemented without some of these specific details. The following description of embodiments is intended only to provide a better understanding of the present disclosure by illustrating examples of the present disclosure.

The existing manner of manually writing the generator parameters into the control system based on the generator parameter table to implement the control often leads to a certain probability of misconfiguration of the wind turbine generator parameters due to misoperation of operators or other factors, and the misconfiguration of the wind turbine generator parameters will significantly affect the control performance, and even seriously affect the operational safety of the generator set. In addition, when model and number of the wind turbine generators in the wind farm increase, the manual configuration of the wind turbine generator parameters will significantly increase software configuration table versions, the software maintenance efficiency is seriously affected.

Based on the above reasons, a solution suitable for parameter identification of the wind turbine generator may be designed from the perspective of manually configuring wind turbine generator parameters, to achieve automatic parameter identification for the wind turbine generator, so as to replace the existing solution of manual configuration of the wind turbine generator parameters and thus to improve the operational reliability of the generator set and software maintenance efficiency.

Figure 1:
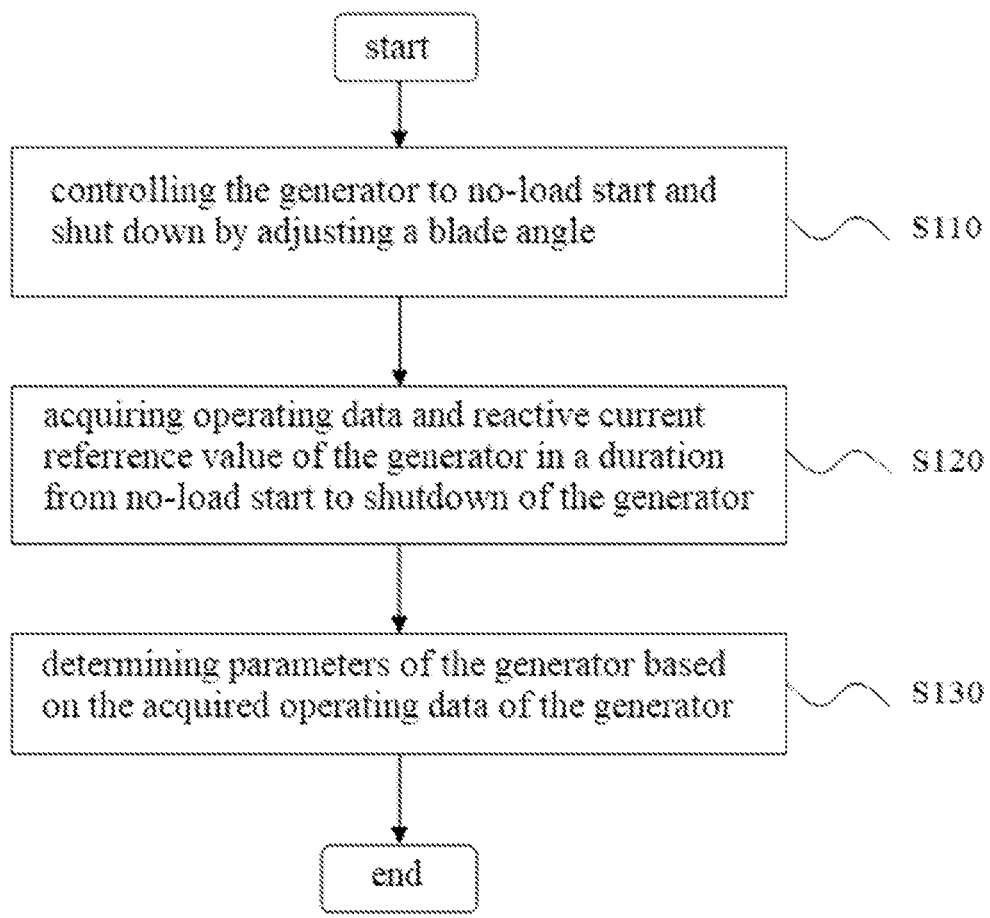
FIG. 1 shows a flow chart illustrating a parameter identification method for a wind turbine generator according to exemplary embodiments of the present disclosure.

FIG. 1 shows a flow chart illustrating a parameter identification method for a wind turbine generator according to exemplary embodiments of the present disclosure. Referring to FIG. 1, the parameter identification method for a wind turbine generator includes steps S110-S130.

In step S110, the generator is controlled to no-load start and shut down by adjusting a blade angle.

Herein, the "by adjusting a blade angle" may be achieved through the following methods. For example, the blade of the generator set of the wind turbine generator may be controlled to rotate by controlling the corresponding pitch device through an automatic control software. The term "no load" refers to no load is connected to the voltage output terminal of the wind turbine generator, i.e. the output power to the outside is zero.

It can be understood that when the blade starts to pitch from a stationary state, the blade angle starts to change and the wind turbine generator starts to operate with no load, and when the blade gradually changes from rotating to the stationary state, the wind turbine generator gradually switches from no-load operation to shutdown.

In step S120, operating data of the generator is acquired in a duration from no-load start to shutdown of the generator. Herein, the operating data of the generator includes, but is not limited to, a terminal voltage, a terminal current and a rotational speed of the generator.

It may be understood that the operating data of the generator may be acquired through the following methods. For example, the terminal voltage and the terminal current of the generator are collected in real time based on a preset sampling period, and the rotational speed of the generator measured synchronously by the main control system of the generator is received.

In an embodiment, the terminal voltage of the generator may be three-phase voltages: phase-a voltage $U_a$, phase-b voltage $U_b$ and phase-c voltage $U_c$, and collecting voltage output by the generator in real time based on a preset sampling period, that is, collecting three-phase terminal voltages output by the generator in real time based on the preset sampling period.

The above "terminal current" can be a current output by the generator in response to input excitation under a condition that, after the wind turbine generator shuts down, and the IGBT on a rectifier side of a converter sends a high-frequency pulse voltage signal or a DC voltage to the generator.

Herein, the "preset sampling period" can be several microseconds, and the specific time can be adjusted according to demands, which is not limited herein.

The above "rotational speed of the generator measured synchronously by the main control system of the generator" can be acquired by any available manner. For example, a magnet is fixed at the rotating part of the generator, and a Hall switch is arranged at the outer edge of the circumference of the magnet's trajectory, the Hall switch periodically induces magnetic lines of force when the generator is rotating, pulse voltages are generated, and the pulses are counted for a certain period of time to acquire the rotational speed of the generator.

In an optional embodiment, before no-load start of the generator, the parameter identification method further includes: closing a circuit breaker between a rectifier side of a converter and the generator to connect the generator to the converter.

Figure 4:
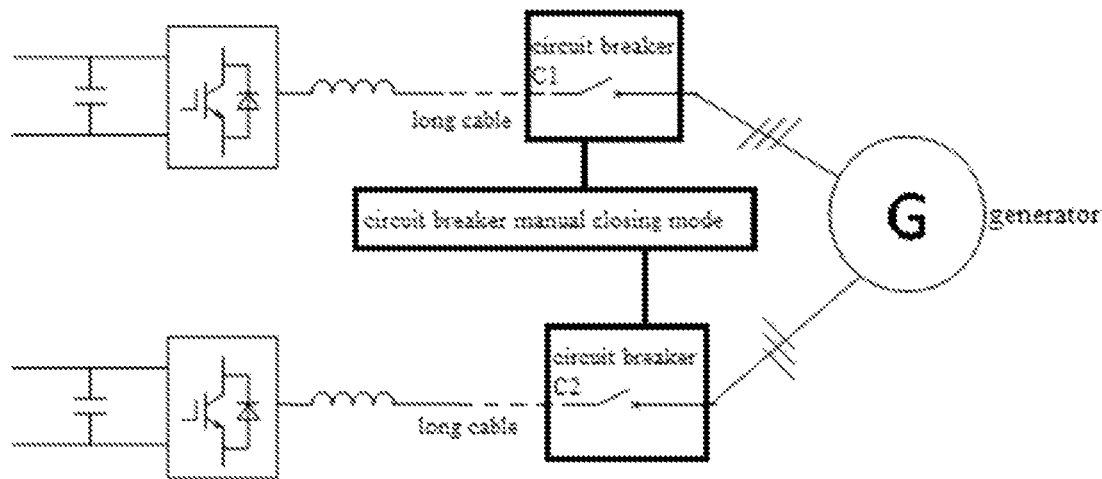
FIG. 4 shows a schematic diagram illustrating a manual controlled closing mode for a circuit breaker of a wind turbine generator according to exemplary embodiments of the present disclosure.

Referring to FIG. 4, a generator side circuit breaker 1 and a generator side circuit breaker 2 are arranged between the generator and the corresponding rectifier side of the converter. It can be understood that the function of setting the circuit breaker closing mode can include providing safety guarantees for staffs. Specifically, under a condition that the wind turbine shuts down and the staffs are preparing to identify the parameters of the wind turbine generator, the staff can confirm that the rectifier side of the converter and the generator are connected and powered-on by closing the circuit breaker, so as to avoid the dangerous situations of electric shock.

The "manual closing mode for the circuit breaker" illustrated in FIG. 4 can refer to the manual controlled enabling, for example, the staff can manually trigger the switch of the control device for controlling the closing or opening of the circuit breaker, and the control device itself can close the circuit breaker through the automatic control software running on it. The manual control herein further includes manual closing, which enables the generator set to close the generator side circuit breaker during shutdown.

In step S130, parameters of the generator are determined based on the acquired operating data of the generator.

First, it should be noted that the parameters of the generator in the present disclosure can include but are not limited to the rotor position angle, pole-pair parameters, flux linkage parameters, stator resistance, and inductance parameters of the generator.

It is understood that the rotor position angle of the generator can be determined through the following methods. For example, a real-time rotor position angle $\theta_{operation}$ when the generator is operating and a rotor position angle $\theta_{shutdown}$ when the generator is shut down can be determined based on the terminal voltage of the generator collected in real time.

Specifically, as an example, first, the three-phase terminal voltages output by the generator are converted into an a-axis voltage and a β-axis voltage of the generator in a two-phase stationary coordinate system. Then, the real-time rotor position angle $\theta_{operation}$ when the generator is operating and the rotor position angle $\theta_{shutdown}$ when the generator is shut down are calculated based on the determined a-axis voltage and β-axis voltage.

Herein, as an alternative embodiment, the phase-a voltage $U_a$, phase-b voltage $U_b$ and phase-c voltage $U_c$ can be converted into the a-axis voltage $U_a$ and the β-axis voltage $U_\beta$ by Clark transform or other available ways, which is not limited herein.

The calculation of the rotor position angle of the generator may be implemented based on equation (1).

$$\theta = \tan^{-1}\frac{U_\beta}{U_a} \qquad (1)$$

Specifically, referring to equation (1), the calculating, based on the determined a-axis voltage $U_a$ and β-axis voltage $U_\beta$, the real-time rotor position angle $\theta_{operation}$ when the generator is operating and the rotor position angle $\theta_{shutdown}$ when the generator is shut down includes: in the duration from no-load start to shutdown of the generator, in response to the a-axis voltage being non-zero, calculating in real time an arctangent value of a ratio between the a-axis voltage and the β-axis voltage in each sampling period to obtain the real-time rotor position angle $\theta_{operation}$; and in response to the a-axis voltage being zero in the sampling period, taking the arctangent value of the ratio between the a-axis voltage and the β-axis voltage in a previous sampling period as the rotor position angle $\theta_{shutdown}$ when the generator is shut down. Herein, the "in response to the a-axis voltage being zero in the sampling period", it can mean that the a-axis voltage is zero for a plurality of consecutive sampling periods, and the generator shutdown can be confirmed.

For another example, the rotor position of the wind turbine generator can be directly measured by arranging a specific measuring device.

It can be understood that the pole-pair number and the flux linkage of the generator can be determined through a variety of methods.

For example, as an optional embodiment, the pole-pair number $P_n$ and the flux linkage $\varphi_f$ of the generator can be determined based on a peak voltage of any phase in the three-phase terminal voltages of the generator collected in any sampling period, the rotational speed of the generator and the real-time rotor position angle $\theta_{operation}$.

Depending on circumstances, the above embodiment for determining the pole-pair number $P_n$ and the flux linkage $\varphi_f$ of the generator can be implemented as follows.

For example, due to the large inertia of the impeller of the wind turbine generator, the rotational speed of the generator can be considered as a fixed value within a certain period of time, and thus the pole-pair number $P_n$ and the flux linkage $\varphi_f$ can be calculated based on equations (2) to (4).

$$f = \frac{d\theta}{dt} \qquad (2)$$

$$P_n = \frac{60f}{n} \qquad (3)$$

$$\varphi_f = \frac{U_{k\_peak}}{2\pi f} \qquad (4)$$

Wherein, f is the frequency of the generator, $P_n$ is the pole-pair number of the generator, and n is the rotational speed of the generator. $U_{k\_peak}$ is the peak voltage of k-phase in the three-phase terminal voltages, and k can be any phase of phase a, phase b, or phase c. The peak voltage of phase a in the three-phase terminal voltages of the generator is taken as an example to perform the calculation, specifically, a frequency of the generator during no-load operation is determined based on a change of the real-time rotor position angle $\theta_{operation}$ in unit time; the pole-pair number $P_n$ of the generator is determined based on the frequency and the rotational speed of the generator; and the flux linkage $\varphi_f$ of the generator is determined based on the peak voltage and the frequency.

For another example, first, the real-time rotor position angle $\theta_{operation}$ corresponding to any sampling period and the preceding sampling period adjacent to that period can be determined, and the difference dθ between the two real-time rotor position angles is calculated. Then, the angle change dθ/dt of the difference dθ in unit time within the sampling period is calculated to obtain the electrical angular velocity $w_e$ of the generator. Next, the pole-pair number $P_n$ of the generator is obtained based on a ratio between the electrical angular velocity $w_e$ and the rotational speed n of the generator $$\left(\text{i.e., } Pn = \frac{60We}{2\pi n}\right).$$

Finally, the flux linkage $\psi_f$ is obtained based on a ratio between the peak voltage $U_{peak}$ and the electrical angular velocity $w_e$ of the generator.

For yet another example, first, the real-time rotor position angle $\theta_{operation}$ corresponding to any sampling period and the preceding sampling period adjacent to that period can be determined, and the difference dθ between the two real-time rotor position angles is calculated. Then, the angle change dθ/dt of the difference dθ in unit time within the sampling period is calculated and multiplied by the rotational speed n of the generator to obtain the mechanical angular velocity Ω of the generator. Next, the pole-pair number $P_n$ of the generator is obtained based on the mechanical angular velocity Ω and the rotational speed n of the generator $$\left(\text{i.e., } Pn = \frac{60\Omega}{2\pi \times n^2}\right).$$

Finally, the flux linkage $\psi_f$ is obtained based on a product of the rotational speed n of the generator and a ratio between the peak voltage $U_{peak}$ and the mechanical angular velocity Ω of the generator.

It can be understood that the stator resistance of the generator can be determined as follows.

For example, after the generator is controlled to shut down by adjusting the blade angle, first, the switching tubes on the rectifier side of the converter can be controlled to operate in a preset operating mode so that the rectifier side of the converter continuously outputs a DC voltage to the generator. Then, three-phase terminal voltages and three-phase stator currents output by the generator can be collected after a current in a circuit formed by the rectifier side of the converter and the generator is stable. Finally, the stator resistance of the generator is determined based on the collected three-phase terminal voltages and three-phase stator currents. In the above preset operating mode, an upper tube of any phase switching tube on the rectifier side of the converter is switched on, and the lower tubes of the other two phase switching tubes on the rectifier side of the converter are switched on.

Figure 5:
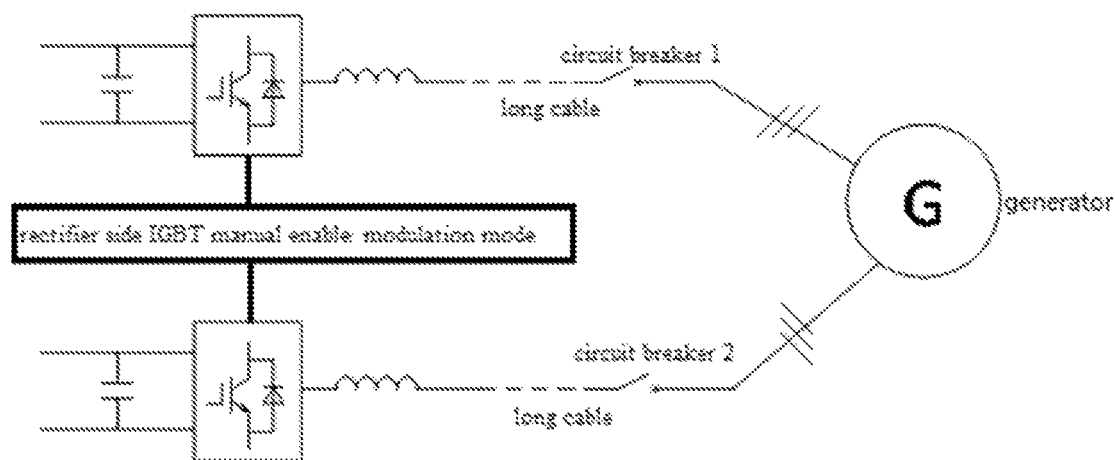
FIG. 5 shows a schematic diagram illustrating an IGBT manual enable mode for a rectifier side of a wind turbine generator according to exemplary embodiments of the present disclosure.

Referring to FIG. 5, the rectifier side of the converter may support a manual enable control mode, for example, the staff may trigger the switch of the control device for controlling the output signal mode of the rectifier side of the converter, and the control device can control the corresponding switching tube to be switched on and off through a pre-set automatic control software, so that the rectifier side of the converter continuously outputs a DC voltage to the generator. The manual enable herein can also be used directly without triggering the software, so that the IGBT can be manually controlled to operate based on the set modulation wave when the generator set is shutdown.

In addition, determining the stator resistance of the generator based on the three-phase terminal voltages and the three-phase stator currents output by the generator can include: first, determining, from the three-phase terminal voltages, a target phase voltage of a phase corresponding to the switching tube of which the upper tube is switched on; then determining, from the three-phase stator currents, a target phase current of the phase corresponding to the switching tube of which the upper tube is switched on; and then determining a line voltage between the target phase voltage and a phase voltage adjacent to the target phase voltage in phase order; finally, obtaining the stator resistance of the generator based on the line voltage and the target phase current.

Herein, corresponding to the combination relationship between "the three-phase terminal voltages and the three-phase stator currents" as described above, the preset operating mode can include any one of the following three operating modes A~C. Specifically, in mode A, the upper tube of the switching tube of phase a on the rectifier side of the converter is switched on, and the lower tubes of the switching tubes of the phases b and c on the rectifier side of the converter are switched on; in mode B, the upper tube of the switching tube of phase b on the rectifier side of the converter is switched on, and the lower tubes of the switching tubes of the phases a and c on the rectifier side of the converter are switched on; and in mode C, the upper tube of the switching tube of phase c on the rectifier side of the converter is switched on, and the lower tubes of the switching tubes of the phases a and b on the rectifier side of the converter are switched on.

Specifically, for mode A, referring to equation (5), the determination of the stator resistance $R_s$ of the generator based on the output voltage and the stator current of the generator can include: determining the line voltage $U_{ab}$ based on the phase-a voltage $U_a$ and the phase-b voltage $U_b$ output by the generator, and multiplying a ratio between the line voltage $U_{ab}$ and the phase-a current $i_a$ by a predetermined factor to obtain the stator resistance $R_S$ of the generator.

$$R_s = \frac{2}{3} \frac{U_{ab}}{i_a} \quad (5)$$

For mode B, referring to equation (6), the determination of the stator resistance $R_s$ of the generator based on the output voltage and the stator current of the generator may include: determining the line voltage $U_{bc}$ based on the phase-b voltage $U_b$ and the phase-c voltage $U_c$ output by the generator, and multiplying a ratio between the line voltage $U_{bc}$ and the phase-b current $i_b$ by a predetermined factor to obtain the stator resistance $R_s$ of the generator.

$$R_s = \frac{2}{3} \frac{U_{bc}}{i_b} \quad (6)$$

For mode C, referring to (7), the determination of the stator resistance $R_s$ of the generator based on the output voltage and the stator current of the generator may include: determining the line voltage $U_{ca}$ based on the phase-c voltage $U_c$ and the phase-a voltage $U_a$ output by the generator, and multiplying a ratio between the line voltage $U_{ca}$ and the phase-c current $i_c$ by a predetermined factor to obtain the stator resistance $R_s$ of the generator.

$$R_s = \frac{2}{3} \frac{U_{ca}}{i_c} \quad (7)$$

It can be understood that the "inductance parameters of the generator" may be determined through the following two methods.

For example, in the first way, first, after the generator is controlled to shut down by adjusting the blade angle, a switching tube on the rectifier side of the converter can be controlled to output high-frequency pulse voltage signals to generator windings. Then, three-phase terminal voltages and three-phase stator currents output by the generator based on excitation of the high-frequency pulse voltage signals are collected. Next, a d-axis voltage $U_d$, a q-axis voltage $U_q$, a d-axis current $i_d$ and a q-axis current $i_q$ of the generator in a target sampling period are determined based on the three-phase terminal voltages, the three-phase stator currents, and the rotor position angle $\theta_{shutdown}$ when the generator is shut down. Finally, a d-axis inductance $L_d$ and a q-axis inductance $L_q$ of the generator are determined based on the d-axis voltage $U_d$, the q-axis voltage $U_q$, the d-axis current $i_d$ and the q-axis current $i_q$ of the generator in the target sampling period, and a preset sampling period.

Herein, referring to FIG. 5, the rectifier side of the converter can support the manual enable mode, for example, the staff can trigger the switch of the control device for controlling the output signal mode of the rectifier side of the converter, and the control device can control the corresponding switching tube to be switched on and off through a pre-set automatic control software, so that the switching tube on the rectifier side of the converter outputs the high-frequency pulse voltage signals.

The collected three-phase terminal voltages include the phase-a voltage $U_a$, the phase-b voltage $U_b$ and the phase-c voltage $U_c$. The three-phase stator currents include the phase-a current $i_a$, the phase-b current $i_b$, and the phase-c current $i_c$.

The above "a d-axis voltage $U_d$, a q-axis voltage $U_q$, a d-axis current $i_d$ and a q-axis current $i_q$ of the generator in a target sampling period are determined based on the three-phase terminal voltages, the three-phase stator currents, and the rotor position angle $\theta_{shutdown}$ when the generator is shut down" can include: first, the phase-a voltage $U_a$, phase-b voltage $U_b$ and phase-c voltage $U_c$ are converted to the α-axis voltage $U_\alpha$, and the β-axis voltage $U_\beta$ in the stationary coordinate system by the Clark transform; then, the α-axis voltage $U_\alpha$ and the β-axis voltage $U_\beta$ are converted to the d-axis voltage $U_d$ and q-axis voltage $U_q$ in a rotating coordinate system by the Park transform based on the rotor position angle $\theta_{shutdown}$. For the phase-a current $i_a$, the phase-b current $i_b$, and the phase-c current similarly, the d-axis current $i_d$ and the q-axis current $i_q$ in the rotating coordinate system may be obtained by the above Clark transform and Park transform.

Due to the actuation duration of the high-frequency pulse signal is short, the winding current of the stator is small, therefore the voltage drop across the stator resistance is ignored. At the same time, due to the generator shutdown, the rotational speed is zero. Based on this, the above "a d-axis inductance $L_d$ and a q-axis inductance $L_q$ of the generator are determined" can be achieved based on the following equations:

$$L_d = \frac{U_d * T_s}{i_{d\_n} - i_{d\_n-1}} \quad (8)$$

$$L_q = \frac{U_q * T_s}{i_{q\_n} - i_{q\_n-1}} \quad (9)$$

wherein, $T_s$ is the target sampling period, the sampling calculation time interval between the d-axis currents and $i_{d\_n}$ and $i_{d\_n-1}$ involved in equations is the target sampling period $T_s$, and the sampling calculation time interval between the q-axis currents $i_{q\_n}$ and $i_{q\_n-1}$ is also the target sampling period $T_s$.

For another example, in the second way, first, after the generator is controlled to shut down by adjusting the blade angle, the switching tube on the rectifier side of the converter may be controlled to output the high-frequency pulse voltage signals to generator windings. Then, the three-phase terminal voltages and the three-phase stator currents output by the generator based on excitation of the high-frequency pulse voltage signals are collected. Next, an average value of d-axis voltages, an average value of q-axis voltages, an average value of d-axis currents and an average value of q-axis currents of the generator in k target sampling periods are determined based on the three-phase terminal voltages, the three-phase stator currents and the rotor position angle $\theta_{shutdown}$ when the generator shutdown. Finally, a d-axis inductance and a q-axis inductance of the generator are determined based on the average value of d-axis voltages, the average value of q-axis voltages, the average value of d-axis currents, the average value of q-axis currents and a duration of the k target sampling periods.

It should be noted that, the second way for determining the "inductance parameters of the generator" differs from the first way in that: the parameters involved in the calculation, such as "the d-axis voltage, the d-axis current, the q-axis voltage, the q-axis current", are replaced with the average values in the plurality of corresponding target sampling periods, and then the calculations are performed to obtain the average values of the inductance parameters of the generator.

Specifically, the following equations can be referenced:

$$\overline{L_d} = \frac{\overline{U_d} * kT_s}{\overline{i_{d\_k}} - \overline{i_{d\_k-1}}} \quad (10)$$

$$\overline{L_q} = \frac{\overline{U_q} * kT_s}{\overline{i_{q\_k}} - \overline{i_{q\_k-1}}} \quad (11)$$

wherein, $kT_s$ represents the k target sampling periods, $\overline{L_d}$ and $\overline{L_q}$ are the average values of the inductance parameters of the generator in the k target sampling periods, $\overline{U_d}$ and $\overline{U_q}$ are the average values of the d-axis voltages and the q-axis voltages of the generator in the k target sampling periods respectively, $\overline{i_{d\_k}}$ and $\overline{i_{d\_k-1}}$ are the average value of the d-axis currents in the previous k target sampling periods and the average value of the d-axis currents in the later k target sampling periods respectively, $\overline{i_{q\_k}}$ and $\overline{i_{q\_k-1}}$ are the average value of the q-axis currents in the previous k target sampling periods and the average value of the q-axis currents in the later k target sampling periods respectively.

As described above, with the parameter identification method for the wind turbine generator of the present disclosure including the steps S110 to S130, key parameters of the wind turbine generator, including the rotor angle, the pole-pair number, the flux linkage, the stator resistance and the inductance, can be effectively identified. Optionally, these parameters can be solidified into the controller to enable the control of the wind turbine generator.

The parameter identification method for the wind turbine generator of the present disclosure is described below with reference to the disclosure example of FIG. 3.

Figure 3:
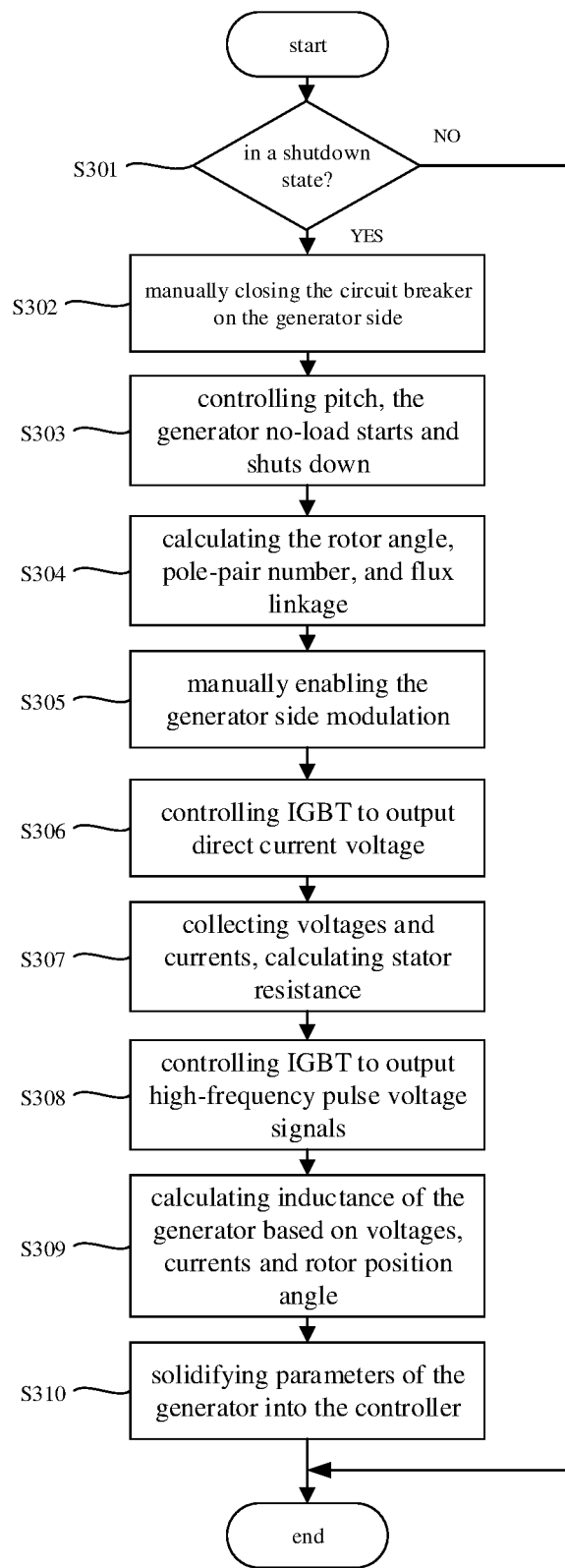
FIG. 3 shows a schematic diagram illustrating an application example of a parameter identification method for a wind turbine generator according to exemplary embodiments of the present disclosure.

Referring to FIG. 3, in step S301, it is determined whether the wind turbine generator is in a shutdown state; if it is in a shutdown state, step S302 is performed, otherwise, no operation will be performed.

In step S302, the circuit breaker at the generator side can be closed manually, in which the "manually" can refer to the manually enabling, for example, the staff can manually trigger the switch of the control device for controlling the closing or opening of the circuit breaker, and the control device itself can close the circuit breaker through the automatic control software running on it. Referring to FIG. 4, the circuit breaker at the generator side refers to a circuit breaker arranged between the wind turbine generator and the rectifier side of the converter.

In step S303, the blade of the wind turbine generator can be controlled to pitch, so as to enable the wind turbine generator to start, operate and shut down.

In step S304, during the pitch process of step S303, the rotor angle, the pole-pair number, and the flux linkage of the wind turbine generator are calculated based on the above equations (1) to (4).

In step S305, the generator side modulation is manually enabled, i.e., the corresponding switching tube is controlled to be switched on and off according to actual situations to achieve IGBT control, so that the rectifier side of the converter can continuously output the DC voltage to the generator; or the switching tube on the rectifier side of the converter can output the high-frequency pulse voltage signals.

In step S306, the IGBT is controlled to output the DC voltage to the wind turbine generator.

In step S307, after the current in the circuit formed by the rectifier side of the converter and the generator is stable, the three-phase terminal voltages and the three-phase stator currents output by the wind turbine generator in response to excitation of the DC voltage are collected, and then the stator resistance of the generator is determined based on the three-phase terminal voltages and the three-phase stator currents.

In step S308, the IGBT is controlled to output the high-frequency pulse voltage signals to wind turbine generator windings.

In step S309, after the current in the circuit formed by the rectifier side of the converter and the generator is stable, the three-phase terminal voltages and the three-phase stator currents output by the generator based on excitation of the above high-frequency pulse voltage signals are collected, and then the inductance of the generator is calculated based on the three-phase terminal voltages, the three-phase stator currents and the rotor angle calculated in the above step S304.

In step S310, solidify the parameters of the generator calculated in the previous steps into the controller for performing the control of the wind turbine generator.

In summary, with the technical solution of the present disclosure, the generator is controlled to no-load start and shut down by adjusting the blade pitch, during which the rotor angle, the pole-pair number and the flux linkage of the generator can be measured by setting a manual enable control closing mode for the circuit breaker at the generator side when the wind turbine shutdown, and safety of the staff can also be ensured. After the generator is shut down, a modulation signal (e.g., a DC voltage or a high-frequency pulse voltage signal) can be output to the generator for excitation by setting an IGBT manual enable modulation mode for the rectifier side of the converter when the wind turbine is shut down, so as to measure the stator resistance and inductance parameters of the generator when the generator is shut down. The solution generally can implement identification of the generator parameters by the control system, the manual configuration of the generator parameters in the control system is avoided and labor costs are reduced; control software versions are significantly reduced and software maintenance costs are reduced. Moreover, the risk of control performance degradation or control system destabilization caused by configuration errors of the generator parameters can also be avoided. In addition, the technical solution of the present disclosure is implemented mainly by optimizing software control and no hardware device is added, cost increase is avoided and applicability of the technical solution is improved.

Figure 2:
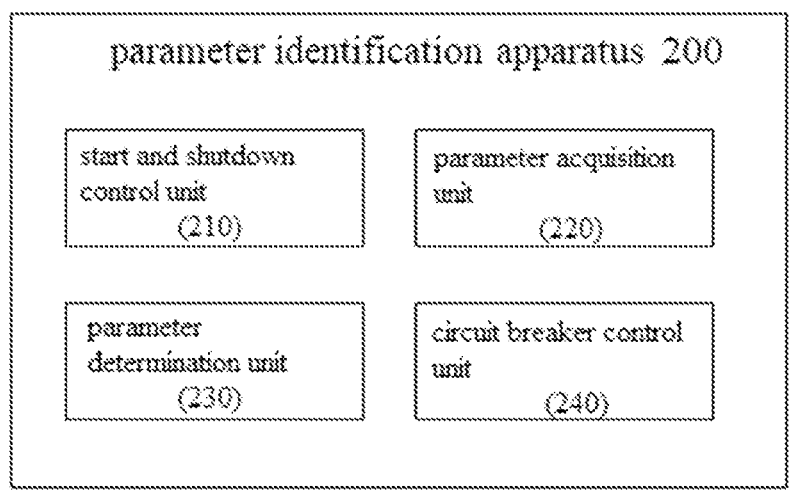
FIG. 2 shows a block diagram illustrating a parameter identification apparatus for a wind turbine generator according to exemplary embodiments of the present disclosure.

FIG. 2 shows a block diagram illustrating a parameter identification apparatus for a wind turbine generator according to exemplary embodiments of the present disclosure. Since the parameter identification method as shown in FIG. 1 is used when the parameter identification apparatus is utilized to identify the parameters of the wind turbine generator, the specific implementation of the parameter identification apparatus can be referred to the implementation of the parameter identification method, which is not repeated herein.

Referring to FIG. 2, the parameter identification apparatus 200 for a wind turbine generator includes a start and shutdown control unit 210, a parameter acquisition unit 220, and a parameter determination unit 230, which are communicatively coupled to each other.

The start and shutdown control unit 210 can be configured to control the generator to no-load start and shut down by adjusting a blade angle; the parameter acquisition unit 220 can be configured to acquire operating data of the generator in a duration from no-load start to shutdown of the generator; and the parameter determination unit 230 can be configured to determine parameters of the generator based on the acquired operating data of the generator. Herein, the operating data of the generator can include a terminal voltage, a terminal current and a rotational speed of the generator.

Optionally, the parameter identification apparatus 200 further includes a circuit breaker control unit 240 configured to: before no-load start of the generator, close a circuit breaker between a rectifier side of a converter and the generator to connect the generator to the converter.

The parameter acquisition unit 220 can be configured to: in response to receiving an enable command, control the converter to collect the terminal voltage and the terminal current of the generator in real time based on a preset sampling period and receive the rotational speed of the generator measured synchronously by the main control system of the generator.

The parameter determination unit 230 may be configured to: determine, based on the terminal voltage of the generator collected in real time, a real-time rotor position angle $\theta_{operation}$ when the generator is operating and a rotor position angle $\theta_{shutdown}$ when the generator is shut down.

Specifically, the parameter determination unit 230 can be configured to: determine, based on three-phase terminal voltages output by the generator, an α-axis voltage and a β-axis voltage at a generator terminal of the generator in a two-phase stationary coordinate system, and calculate, based on the determined α-axis voltage and β-axis voltage, the real-time rotor position angle $\theta_{operation}$ when the generator is operating and the rotor position angle $\theta_{shutdown}$ when the generator is shut down.

Further, the parameter determination unit 230 can be configured to: in the duration from no-load start to shutdown of the generator, in response to the α-axis voltage being non-zero, calculate in real time an arctangent value of a ratio between the α-axis voltage and the β-axis voltage in each sampling period to obtain the real-time rotor position angle $\theta_{operation}$; and in response to the α-axis voltage being zero in the sampling period, take the arctangent value of the ratio between the α-axis voltage and the β-axis voltage in a previous sampling period as the rotor position angle $\theta_{shutdown}$ when the generator is shut down.

Optionally, the parameter determination unit 230 can be configured to: determine a pole-pair number and flux linkage of the generator based on a peak voltage of any of the three-phase terminal voltages of the generator collected in any sampling period, the rotational speed of the generator and the real-time rotor position angle $\theta_{operation}$.

Further, the parameter determination unit 230 can be configured to: determine a frequency of the generator during no-load operation based on a change of the real-time rotor position angle $\theta_{operation}$ in unit time; determine the pole-pair number of the generator based on the frequency and the rotational speed of the generator; and determine the flux linkage of the generator based on the peak voltage and the frequency.

Optionally, after the start and shutdown control unit 210 controls the generator to shut down by adjusting the blade angle, the parameter acquisition unit 220 can be configured to: control the switching tubes on the rectifier side of the converter to operate in a preset operating mode so that the rectifier side of the converter continuously outputs a DC voltage to the generator. After a current in a circuit formed by the rectifier side of the converter and the generator is stable, three-phase terminal voltages and three-phase stator currents output by the generator are collected. The stator resistance of the generator are determined based on the three-phase terminal voltages and the three-phase stator currents.

Specifically, in the preset operating mode, an upper tube of any phase switching tube on the rectifier side of the converter is switched on, and the lower tubes of the other two phase switching tubes on the rectifier side of the converter are switched on.

Further, the parameter determination unit 230 can be configured to: determine, from the three-phase terminal voltages, a target phase voltage of a phase corresponding to the switching tube of which the upper tube is switched on; determine, from the three-phase stator currents, a target phase current of the phase corresponding to the switching tube of which the upper tube is switched on; determine a line voltage between the target phase voltage and a phase voltage adjacent to the target phase voltage in phase order; and obtain the stator resistance of the generator based on the line voltage and the target phase current.

Optionally, after the generator is controlled to shut down by adjusting the blade angle, the parameter acquisition unit

220 can be configured to: control a switching tube on a rectifier side of a converter to output high-frequency pulse voltage signals to generator windings; and collect three-phase terminal voltages and three-phase stator currents output by the generator based on excitation of the high-frequency pulse voltage signals. The parameter determination unit 230 can be configured to: determine a d-axis voltage, a q-axis voltage, a d-axis current and a q-axis current of the generator in a target sampling period, based on the three-phase terminal voltages, the three-phase stator currents, and the rotor position angle $\theta_{shutdown}$ when the generator is shut down; and determine a d-axis inductance and a q-axis inductance of the generator, based on the d-axis voltage, the q-axis voltage, the d-axis current and the q-axis current of the generator in the target sampling period, and a preset sampling period.

Optionally, after the generator is controlled to shut down by adjusting the blade angle, the parameter acquisition unit 220 can be configured to: control a switching tube on a rectifier side of a converter to output high-frequency pulse voltage signals to generator windings; and collect three-phase terminal voltages and three-phase stator currents output by the generator based on excitation of the high-frequency pulse voltage signals. The parameter determination unit 230 can be configured to: determine an average value of d-axis voltages, an average value of q-axis voltages, an average value of d-axis currents and an average value of q-axis currents of the generator in k target sampling periods, based on the three-phase terminal voltages, the three-phase stator currents and the rotor position angle $\theta_{shutdown}$ when the generator is shut down; and determine a d-axis inductance and a q-axis inductance of the generator, based on the average value of d-axis voltages, the average value of q-axis voltages, the average value of d-axis currents, the average value of q-axis currents and a duration of the k target sampling periods.

It should be understood that the various units/modules in the parameter identification apparatus for the wind turbine generator according to exemplary embodiments of the present disclosure can be implemented as hardware components and/or software components.

Depending on the processing performed by the various units/modules as defined, those skilled in the art may use, for example, a field programmable gate array (FPGA) or an disclosure specific integrated circuit (ASIC), to implement the various units/modules.

According to another aspect of exemplary embodiments of the present disclosure, a computer-readable storage medium storing a computer program is provided, in which the computer program, when executed by a processor, implements the parameter identification method of the present disclosure.

Specifically, the control method according to exemplary embodiments of the present disclosure can be written as a computer program, code segment, instruction, or any combination thereof, and recorded, stored, or secured in or on one or more non-transitory computer-readable storage media. The computer-readable storage medium is any data storage device that can store data read out by a computer system. Examples of the computer-readable storage media include: read-only memory, random access memory, read-only CD, magnetic tape, floppy disk, optical data storage device, and carrier wave (such as data transmission over the Internet via wired or wireless transmission path).

According to yet another aspect of exemplary embodiments of the present disclosure, an electronic device is provided, including: at least one processor; and at least one memory storing computer-executable instructions; in which the computer-executable instructions, when executed by the at least one processor, cause the at least one processor to perform the parameter identification method for a wind turbine generator of the present disclosure.

Specifically, the electronic device may be broadly defined as a tablet, a smartphone, a smart watch, or any other electronic device having necessary computing and/or processing capabilities. In an embodiment, the electronic device may include a processor, a memory, a network interface, a communication interface, etc., connected via a system bus. The processor of the electronic device may be used to provide the necessary computing, processing, and/or control capabilities. The memory of the electronic device may include a non-volatile storage medium and an internal memory. The non-volatile storage medium may have an operating systems, a computer program, etc. stored therein or thereon. The internal memory may provide an environment for the operation of the operating system and the computer program in the non-volatile storage medium. The electronic device has a network interface and a communication interface that may be used to connect and communicate with an external device via a network.

In summary, with the technical solution of the present disclosure, the generator is controlled to no-load start and shut down by adjusting the blade pitch, during which the rotor angle, the pole-pair number and the flux linkage of the generator can be measured by setting a manual enable control closing mode for the circuit breaker at the generator side when the wind turbine is shut down, and safety of the staff can also be ensured; after the generator shuts down, a modulation signal (e.g., a DC voltage or a high-frequency pulse voltage signal) can be output to the generator for excitation by setting an IGBT manual enable modulation mode for the rectifier side of the converter when the wind turbine is shut down, so as to measure the stator resistance and inductance parameters of the generator when the generator is shut down. The solution generally can implement identification of the generator parameters by the control system, the manual configuration of the generator parameters in the control system is avoided and labor costs are reduced; control software versions are significantly reduced and software maintenance costs are reduced; and the risk of control performance degradation or control system destabilization caused by configuration errors of the generator parameters is avoided. In addition, the technical solution of the present disclosure is implemented mainly by optimizing software control and no hardware device is added, cost increase is avoided and applicability of the technical solution is improved.

While some exemplary embodiments of the present disclosure have been represented and described, those skilled in the art should understand that these embodiments may be modified without departing from the principles and spirit of the present disclosure in the scope as defined in the claims and their equivalents.

What is claimed is:

1. A parameter identification method for a wind turbine generator, comprising:
controlling the generator to no-load start and shut down by adjusting a blade angle;
acquiring operating data of the generator in a duration from no-load start to shutdown of the generator; and
determining parameters of the generator based on the acquired operating data of the generator.

2. The parameter identification method of claim 1, wherein the operating data of the generator comprises: a terminal voltage, a terminal current and a rotational speed of the generator.

3. The parameter identification method of claim 2, wherein determining the parameters of the generator based on the acquired operating data of the generator comprises:
determining, based on the terminal voltage of the generator collected in real time, a real-time rotor position angle $\theta_{operation}$ when the generator is operating and a rotor position angle $\theta_{shutdown}$ when the generator is shut down.

4. The parameter identification method of claim 3, wherein determining, based on the terminal voltage of the generator collected in real time, the real-time rotor position angle $\theta_{operation}$ when the generator is operating and the rotor position angle $\theta_{shutdown}$ when the generator is shut down comprises:
determining, based on three-phase terminal voltages output by the generator, an α-axis voltage and a β-axis voltage at a generator terminal of the generator in a two-phase stationary coordinate system; and
calculating, based on the determined α-axis voltage and β-axis voltage, the real-time rotor position angle $\theta_{operation}$ when the generator is operating and the rotor position angle $\theta_{shutdown}$ when the generator is shut down.

5. The parameter identification method of claim 4, wherein calculating, based on the determined α-axis voltage and β-axis voltage, the real-time rotor position angle $\theta_{operation}$ when the generator is operating and the rotor position angle $\theta_{shutdown}$ when the generator is shut down comprises:
in the duration from no-load start to shutdown of the generator, in response to the α-axis voltage being non-zero, calculating in real time an arctangent value of a ratio between the α-axis voltage and the β-axis voltage in each sampling period to obtain the real-time rotor position angle $\theta_{operation}$; and
in response to the α-axis voltage being zero in the sampling period, taking the arctangent value of the ratio between the α-axis voltage and the β-axis voltage in a previous sampling period as the rotor position angle $\theta_{shutdown}$ when the generator is shut down.

6. The parameter identification method of claim 4, wherein determining the parameters of the generator based on the acquired operating data of the generator further comprises:
determining a pole-pair number and flux linkage of the generator based on a peak voltage of any of the three-phase terminal voltages of the generator collected in any sampling period, the rotational speed of the generator and the real-time rotor position angle $\theta_{operation}$.

7. The parameter identification method of claim 6, wherein determining the pole-pair number and flux linkage of the generator based on the peak voltage of any of the three-phase terminal voltages of the generator collected in any sampling period, the rotational speed of the generator and the real-time rotor position angle $\theta_{operation}$ comprises:
determining a frequency of the generator during no-load operation based on a change of the real-time rotor position angle $\theta_{operation}$ in unit time;
determining the pole-pair number of the generator based on the frequency and the rotational speed of the generator; and
determining the flux linkage of the generator based on the peak voltage and the frequency.

8. The parameter identification method of claim 3, wherein after controlling the generator to shut down by adjusting the blade angle, the parameter identification method further comprises:
controlling a switching tube on a rectifier side of a converter to output high-frequency pulse voltage signals to generator windings;
collecting three-phase terminal voltages and three-phase stator currents output by the generator based on excitation of the high-frequency pulse voltage signals;
determining a d-axis voltage, a q-axis voltage, a d-axis current and a q-axis current of the generator in a target sampling period, based on the three-phase terminal voltages, the three-phase stator currents, and the rotor position angle $\theta_{shutdown}$ when the generator is shut down; and
determining a d-axis inductance and a q-axis inductance of the generator, based on the d-axis voltage, the q-axis voltage, the d-axis current and the q-axis current of the generator in the target sampling period, and a preset sampling period.

9. The parameter identification method of claim 3, wherein after controlling the generator to shut down by adjusting the blade angle, the parameter identification method further comprises:
controlling a switching tube on a rectifier side of a converter to output high-frequency pulse voltage signals to generator windings;
collecting three-phase terminal voltages and three-phase stator currents output by the generator based on excitation of the high-frequency pulse voltage signals;
determining an average value of d-axis voltages, an average value of q-axis voltages, an average value of d-axis currents and an average value of q-axis currents of the generator in k target sampling periods, based on the three-phase terminal voltages, the three-phase stator currents and the rotor position angle $\theta_{shutdown}$ when the generator is shut down; and
determining a d-axis inductance and a q-axis inductance of the generator, based on the average value of d-axis voltages, the average value of q-axis voltages, the average value of d-axis currents, the average value of q-axis currents and a duration of the k target sampling periods.

10. The parameter identification method of claim 1, wherein before no-load start of the generator, the parameter identification method further comprises: closing a circuit breaker between a rectifier side of a converter and the generator to connect the generator to the converter.

11. The parameter identification method of claim 10, wherein after controlling the generator to shut down by adjusting the blade angle, the parameter identification method further comprises:
controlling the switching tubes on the rectifier side of the converter to operate in a preset operating mode so that the rectifier side of the converter continuously outputs a DC voltage to the generator;
collecting, after a current in a circuit formed by the rectifier side of the converter and the generator is stable, three-phase terminal voltages and three-phase stator currents output by the generator; and
determining a stator resistance of the generator based on the three-phase terminal voltages and the three-phase stator currents.

12. The parameter identification method of claim 11, wherein in the preset operating mode, an upper tube of any phase switching tube on the rectifier side of the converter is switched on, and the lower tubes of the other two phase switching tubes on the rectifier side of the converter are switched on;

determining the stator resistance of the generator based on the three-phase terminal voltages and the three-phase stator currents comprises:

determining, from the three-phase terminal voltages, a target phase voltage of a phase corresponding to the switching tube of which the upper tube is switched on;

determining, from the three-phase stator currents, a target phase current of the phase corresponding to the switching tube of which the upper tube is switched on;

determining a line voltage between the target phase voltage and a phase voltage adjacent to the target phase voltage in phase order; and obtaining the stator resistance of the generator based on the line voltage and the target phase current.

13. A computer-readable storage medium storing a computer program, wherein the computer program, when executed by a processor, implements the parameter identification method for a wind turbine generator of claim 1.

14. An electronic device, comprising:
- at least one processor; and
- at least one memory storing computer-executable instructions;
- wherein the computer-executable instructions, when executed by the at least one processor, cause the at least one processor to perform the parameter identification method for a wind turbine generator of claim 1.

15. A parameter identification apparatus for a wind turbine generator, comprising:
- a start and shutdown control unit configured to control the generator to no-load start and shut down by adjusting a blade angle;
- a parameter acquisition unit configured to acquire operating data of the generator in a duration from no-load start to shutdown of the generator; and
- a parameter determination unit configured to determine parameters of the generator based on the acquired operating data of the generator.

\* \* \* \* \*